(12) United States Patent
Brooks et al.

(10) Patent No.: US 10,370,012 B2
(45) Date of Patent: Aug. 6, 2019

(54) ADAPTIVE VEHICLE CONTROL SYSTEM

(71) Applicant: General Electric Company, Schenectady, NY (US)

(72) Inventors: James D. Brooks, Schenectady, NY (US); Harry Mathews, Jr., Niskayuna, NY (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 48 days.

(21) Appl. No.: 15/482,240

(22) Filed: Apr. 7, 2017

(65) Prior Publication Data
US 2018/0257682 A1 Sep. 13, 2018

Related U.S. Application Data

(60) Provisional application No. 62/469,142, filed on Mar. 9, 2017.

(51) Int. Cl.
*G05D 1/00* (2006.01)
*B61L 15/00* (2006.01)
(Continued)

(52) U.S. Cl.
CPC ........... *B61L 3/006* (2013.01); *B61L 15/0018* (2013.01); *B61L 15/0072* (2013.01); *G05D 1/0061* (2013.01)

(58) Field of Classification Search
None
See application file for complete search history.

(56) References Cited

U.S. PATENT DOCUMENTS

| 5,729,619 A | 3/1998 | Puma |
| 6,822,573 B2 | 11/2004 | Basir et al. |
(Continued)

FOREIGN PATENT DOCUMENTS

| CN | 1784701 A | 6/2006 |
| CN | 1910593 B | 9/2011 |
(Continued)

OTHER PUBLICATIONS

Eskandarian, "Drowsy and Fatigued Driving Problem Significance and Detection Based on Driver Control Functions", Reference Work Entry, pp. 941-974, 2012.
(Continued)

*Primary Examiner* — Adam D Tissot
(74) *Attorney, Agent, or Firm* — Christopher R. Carroll; The Small Patent Law Group LLC

(57) ABSTRACT

A vehicle system having processors configured to determine permissible regions of a trip where the vehicle system is permitted for automatic control. The permissible regions of the trip are determined based on one or more of parameters of a route, a trend of operating parameters of the vehicle system, or a trip plan that designates one or more operational settings of the vehicle system at different locations, different times, or different distances along a route. The processors also are configured to control transition of the vehicle system between manual control and the automatic control in the permissible regions by alerting an operator of the vehicle system, automatically switching between the manual control and the automatic control, or modifying conditions on which the transition occur.

16 Claims, 10 Drawing Sheets

(51) Int. Cl.
*G08B 21/00* (2006.01)
*B61L 3/00* (2006.01)

(56) References Cited

U.S. PATENT DOCUMENTS

| | | | |
|---|---|---|---|
| 6,903,658 B2* | 6/2005 | Kane | B61L 15/009 180/272 |
| 6,927,694 B1 | 8/2005 | Smith et al. | |
| 6,946,966 B2 | 9/2005 | Koenig | |
| 8,698,639 B2 | 4/2014 | Fung et al. | |
| 8,952,819 B2 | 2/2015 | Nemat-Nasser | |
| 2005/0024212 A1 | 2/2005 | Hultzsch | |
| 2007/0008151 A1 | 1/2007 | Victor et al. | |
| 2009/0261979 A1 | 10/2009 | Breed et al. | |
| 2010/0222687 A1 | 9/2010 | Thijs et al. | |
| 2013/0171590 A1* | 7/2013 | Kumar | B61L 3/006 434/62 |
| 2014/0156133 A1* | 6/2014 | Cullinane | B60W 30/00 701/23 |

FOREIGN PATENT DOCUMENTS

| | | |
|---|---|---|
| CN | 102902874 A | 1/2013 |
| CN | 104584084 A | 4/2015 |
| CN | 104732251 A | 6/2015 |
| CN | 104973054 A | 10/2015 |
| DE | 3826943 A1 | 2/1990 |
| GB | 2465439 A | 5/2010 |
| JP | 2008223879 A | 9/2008 |
| KR | 20150007536 A | 1/2015 |
| WO | 2006000166 A1 | 1/2006 |
| WO | 2015066445 A1 | 5/2015 |
| WO | 2015174963 A1 | 11/2015 |
| WO | 2015175435 A1 | 11/2015 |
| WO | 2016044678 A1 | 3/2016 |

OTHER PUBLICATIONS

Shende et al., "Driver Fatigue Detection System and the Status Transmission", International Journal of Innovative Research in Science,Engineering and Technology, vol. 4, Issue: 6, Jun. 2015.
Sinha et al., "Real Time Implementation for Monitoring Drowsiness Condition of a Train Driver using Brain Wave Sensor", International Journal of Computer Applications, vol. 139, Issue: 09, Apr. 2016.
Maqbool, "Driver Drowsiness Detection—The Technology Race in the Car to Keep the Driver Awake and Focused", http://www.tapedaily.com/technological-race-car-keep-driver-awake-focused/ retrieved on Nov. 2, 2016.

* cited by examiner

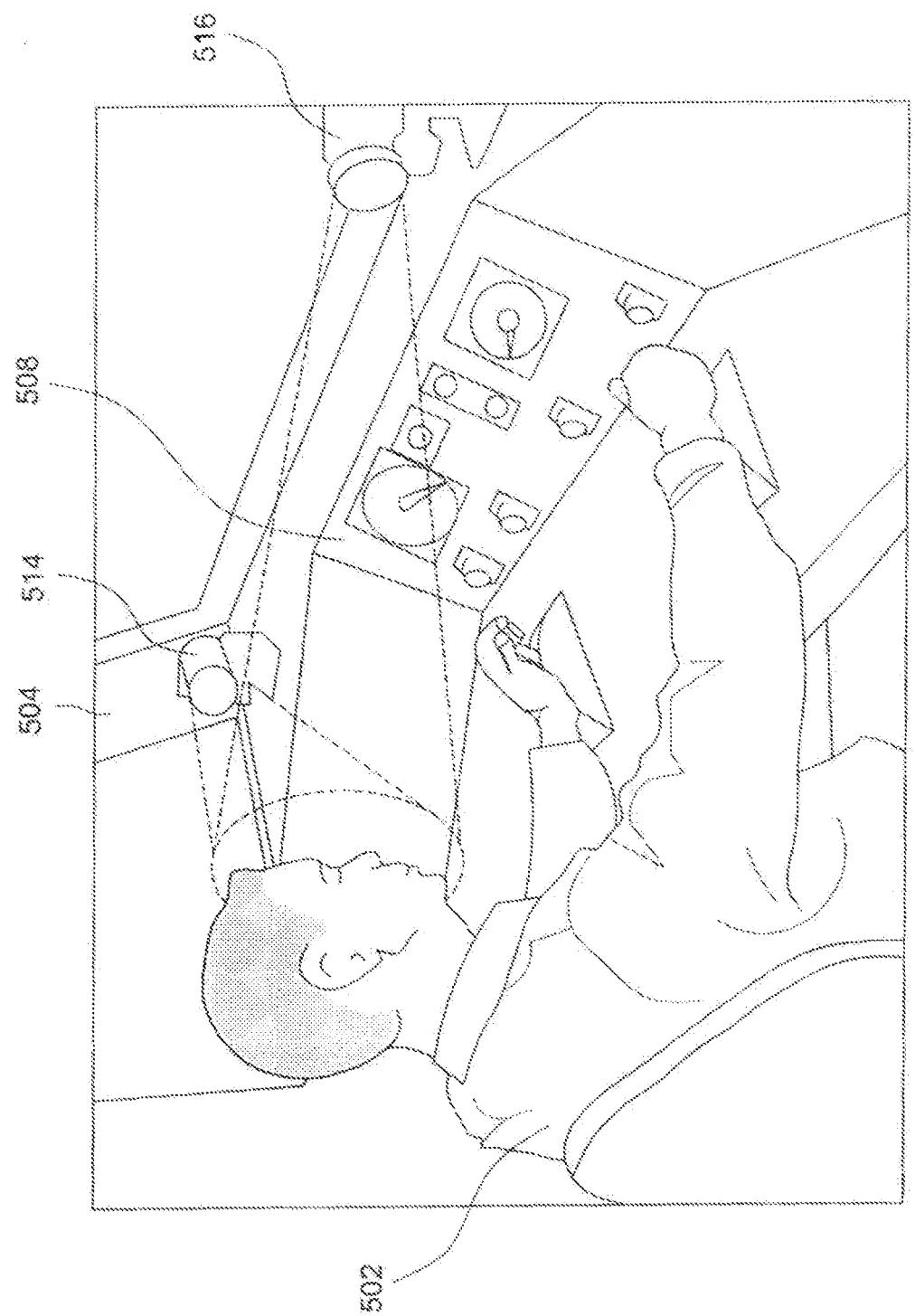

ADAPTIVE VEHICLE CONTROL SYSTEM

CROSS-REFERENCE TO RELATED APPLICATIONS

This Non-Provisional application claims priority to U.S. Provisional Application Ser. No. 62/469,142 filed Mar. 9, 2017, the entire disclosure of which is incorporated herein by reference.

BACKGROUND

Some existing systems can be used to automatically control movement of vehicle systems during a trip to reduce fuel consumption and/or emission generation relative to manual control of the vehicle systems.

However, increased use of automatic control can lead to a decrease in the skill and the alertness of vehicle operators. Existing systems for addressing operator alertness typically require operators to respond to audio or visual prompts at predetermined intervals to ensure the operators are alert during manual control of the vehicle. Operators who are alert may find the prompts unnecessarily intrusive and obstructive to control of the vehicles. The requirement to repeatedly respond to the prompts, even in light of the operators being aware, can serve as an additional distraction to the same operation of the vehicles. Furthermore, these existing systems do little to nothing to prevent decreasing of operator skills.

DESCRIPTION OF THE DRAWINGS

In the accompanying drawings, which form part of the specification:

FIG. 5 is a schematic diagram of an alertness detection system for monitoring an operator within a vehicle in accordance with one embodiment;

Corresponding reference numerals indicate corresponding parts throughout the several figures of the drawings.

BRIEF DESCRIPTION

Figure 1:
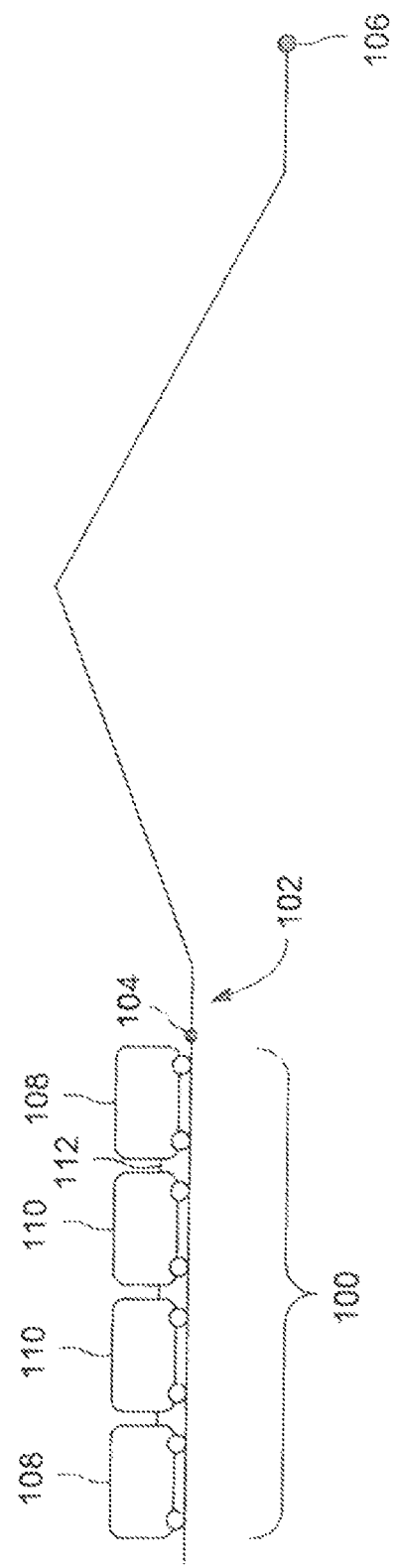
FIG. 1 schematically illustrates a trip of a vehicle system along a route according to one embodiment.

In one embodiment, one or more processors are configured to determine one or more permissible regions of a trip where the vehicle system is permitted for automatic control. The one or more permissible regions of the trip are determined based on one or more of parameters of a route, a trend of operating parameters of the vehicle system, or a trip plan that designates one or more operational settings of the vehicle system at one or more different locations, one or more different times, or one or more different distances along a route. The one or more processors also are configured to control transition of the vehicle system between manual control and the automatic control in the one or more permissible regions by one or more of alerting an operator of the vehicle system, automatically switching between the manual control and the automatic control, or modifying one or more conditions on which the transition occur.

In another embodiment, determining a trip plan including an automatic control trip plan and an expected manual control trip plan based on one or more parameters. The method also includes determining a region of a trip based on one or more parameters, and responsive to the one or more of the parameters or the region of the trip that are determined, switching control of the vehicle system from automatic control to manual control.

In another embodiment, a system includes one or more processors configured for determination of operating parameters of the vehicle system. One or more processors also are configured to designate regions for either automatic control or manual control. One or more processors also are configured to switch control of the vehicle system from automatic control to manual control responsive to the determination of the operating parameters.

DETAILED DESCRIPTION

The following detailed description illustrates the inventive subject matter by way of example and not by way of limitation. The description enables one of ordinary skill in the art to make and use the inventive subject matter, describes several embodiments of the inventive subject matter, as well as adaptations, variations, alternatives, and uses of the inventive subject matter. Additionally, it is to be understood that the inventive subject matter is not limited in its application to the details of construction and the arrangements of components set forth in the following description or illustrated in the drawings. The inventive subject matter is capable of other embodiments and of being practiced or being carried out in various ways. Also, it is to be understood that the phraseology and terminology used herein is for the purpose of description and should not be regarded as limiting on all embodiments of the inventive subject matter.

As shown in FIGS. 1-8, an embodiment constructed in accordance with the present disclosure, generally referred to as a vehicle system 100, travels along a route 102 from a first location 104 to a different, second location 106 according to a trip plan determined by an energy management system 210. The trip plan designates one or more operational settings, such as throttle settings, brake settings, speeds, etc., at different locations along one or more routes, different times during the trip, and/or different distances along the one or more routes. The operational settings of the trip plan are determined by the energy management system 210 in order to reduce fuel consumed and/or emissions generated by the vehicle system relative to the vehicle system traveling along the same routes according to other settings, such as an upper speed limit of the routes, while causing the vehicle system 100 to arrive within a designated amount (e.g., 10%) of a scheduled arrival time. The vehicle control system 201 includes an adaptive capability that switches between automatic control and manual control in response to changes in the operating parameters as indicated by the energy management system 210, or changes in the operator's alertness as indicated by an alertness detection system 214.

The alertness detection system 214 monitors how alert one or more operators of the vehicle system are, and optionally provides prompts to the operators requiring responses from the operators to allow the vehicle system to continue moving. The alertness detection system 214 can comprise any arrangement of components and/or methods that provide an indication of an operator's alertness. One exemplary embodiment is a physical and psychophysiological (3P) model for estimating operator parameters and conditions including fatigue and drowsiness in real-time, which is discussed in detail below and illustrated in FIGS. 5-8. In an alternative embodiment, the alertness detection system 214 can comprise an alerter which may require input from the operator at predetermined times or to measure reaction times to indicate an operator's awareness. Alternatively, the operator may be monitored remotely, such as with a video camera, by a supervisor.

The vehicle system 100 includes one or more propulsion-generating vehicles 108 and optionally may include one or more non-propulsion-generating vehicles 110 (FIG. 1). The vehicles 108, 110 may be mechanically coupled with each other, such as by couplers 112, such that the vehicles 108, 110 travel together. Optionally, the vehicle system 100 may include propulsion-generating vehicles 108 that are logically connected to each other without being mechanically coupled with each other. For example, the propulsion-generating vehicles 108 may communicate with each other to coordinate the movements of the vehicles 108 with each other such that the vehicles 108 travel together in a platoon.

The propulsion-generating vehicles 108 can represent one or more different vehicles that generate tractive effort or power to move the vehicle system 100 along the route 102. For example, the vehicles 108 can represent automobiles, locomotives, other off-highway vehicles (e.g., vehicles that are not designed and/or not permitted to travel on public roadways), marine vessels, aircraft, or the like. The non-propulsion-generating vehicles 110 can represent vehicles that do not generate tractive effort or power, or propulsive effort or power. For example, the vehicles 110 can represent railcars, trailers, barges, or the like. Alternatively, the vehicle system 100 may include a single propulsion-generating vehicle.

In operation, the vehicle control system 201 automatically controls movement of the vehicle system 100 according to the trip plan. The vehicle control system 201 examines one or more upcoming segments of the trip to determine where the vehicle control system 201 can switch from automatic control (according to the trip plan or another automated system) to manual control. Because operators may become less alert and/or have skills diminish during prolonged automated control, the vehicle control system 201 determines where to switch from automatic control to manual control in order to ensure that the operator is alert, remains alert, and/or maintains or improves the skill of the operator. The vehicle control system 201 examines the upcoming segment(s) of the routes and trip plan to determine which permissible regions or parts of the trip that the control of the vehicle system 100 can switch from automated control to manual control without consuming additional amounts of fuel, without generating additional amounts of emissions, without posing safety risks, etc., relative to remaining in automated control per the trip plan. The vehicle control system 201 then switches from automatic control to manual control at or within these regions, and returns to automatic control upon leaving these regions (or if the operator is not alert). The switching between automatic and manual control can maintain the alertness and/or skill of the operator, without consuming a significant amount of excess fuel and/or generating a significant amount of excess emissions relative to traveling according to automatic control during those regions where the system switched to manual control.

The vehicle control system 201 can determine which regions of the route 102 are under automatic control or manual control according to various methods or algorithms. For example, the vehicle control system determines the regions as a function of estimated or expected trip plans, a function of track parameters, or a function of trending operating parameters. Track parameters can include, but are not limited to, track gradient, track curvature, track cant, notch changes, terrain characteristics, or transitions in speed limits. Trending operating parameters can include, but are not limited to, operational settings, operator alertness, fuel efficiency, weather conditions, terrain, or availability of independent distributed power.

In an exemplary embodiment illustrated in FIGS. 3A-4A, the vehicle control system 201 determines the permissible regions as a function of estimated or expected trip plans. To determine which permissible regions of the route 102 are under automatic control or manual control, the vehicle control system 201 compares an automated control trip plan 320 to an estimated or expected manual control trip plan 322 to identify permissible regions where the variance 328 in one or more operating parameters of the vehicle system 100 between the plans 320 and 322 is reduced relative to the overall route. The operating parameters can relate to any relevant aspect of vehicle operation, including, but not limited to, fuel efficiency, time, distance, speed, the number of notch changes, the number of transitions in speed limits, availability of independent distributed power, terrain characteristics. The designation of auto regions 324 and manual regions 326 can be determined prior to travel along the route. Alternatively, the designation of auto regions 324 and manual regions 326 can be determined during travel along the route, based on the alertness of the operator as determined by the alertness detection system, or other parameters.

Figure 3A:
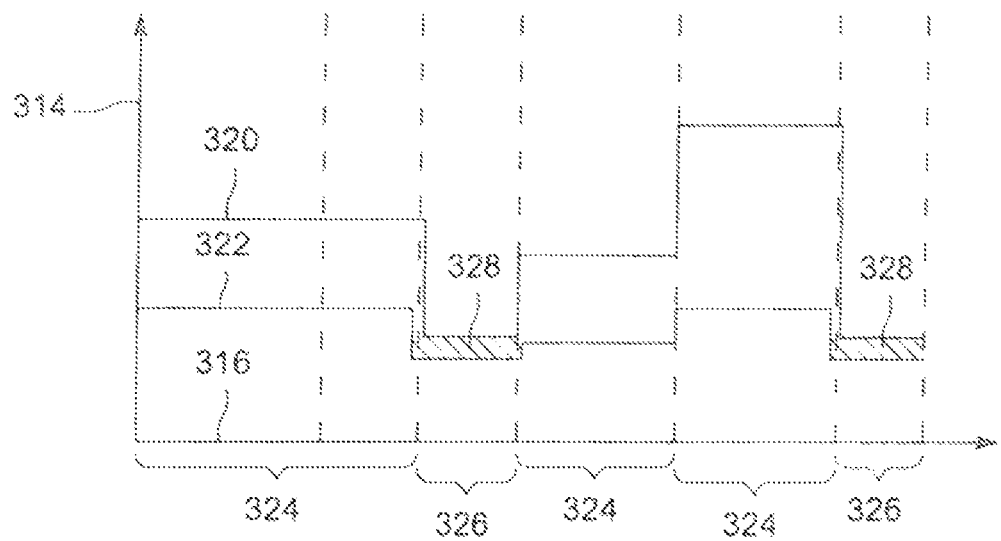
FIG. 3A illustrates a chart comparing the automated control trip plan relative to the manual control trip plan.

FIG. 3A illustrates a fuel efficiency of the vehicle system 100 (shown in FIG. 1) according to the expected manual control trip plan 320 and the automatic control trip plan 322 according to one example. The vertical axis 314 represents the fuel efficiency of the vehicle system 100. The horizontal axis 316 represents the distance travelled along the route 102. Auto regions 324 and manual regions 326 are designated for operation according to either a respective automatic control trip plan 320 or the manual control trip plan 322.

The exemplary embodiment of FIG. 3A illustrates an expected manual control trip plan 322 determined based on an expected fuel efficiency. Alternatively, the expected manual control trip plan 322 can determined according to other parameters. For example, the manual control trip plan 322 can be based on parameters including, but not limited to, trip planning data, a model of driver behavior, or historic data from previous operation of the vehicle system, operation settings, fuel efficiency, weather conditions, terrain characteristics the number of notch changes, the number of transitions in speed limits, or availability of independent distributed power, parameters. Using such factors, the vehicle control system 201 can determine an estimated one or more parameters, for the route 102 for designation as the expected manual control trip plan 322. This is reflected in the example illustrated in FIG. 3A as the expected manual control trip plan 322 based on fuel efficiency.

The automated trip plan 320 designates operational settings of the vehicle system 100 as a function of time and/or distance along the route 102. These operational settings can include speeds, accelerations, throttle positions, brake settings (e.g., brake pressures), or the like. Traveling according to the automated trip plan 320 can cause the vehicle system 100 to reduce the amount of fuel consumed and/or emissions generated by the vehicle system 100 relative to the vehicle system 100 traveling according to other, different operational settings.

Figure 3B:
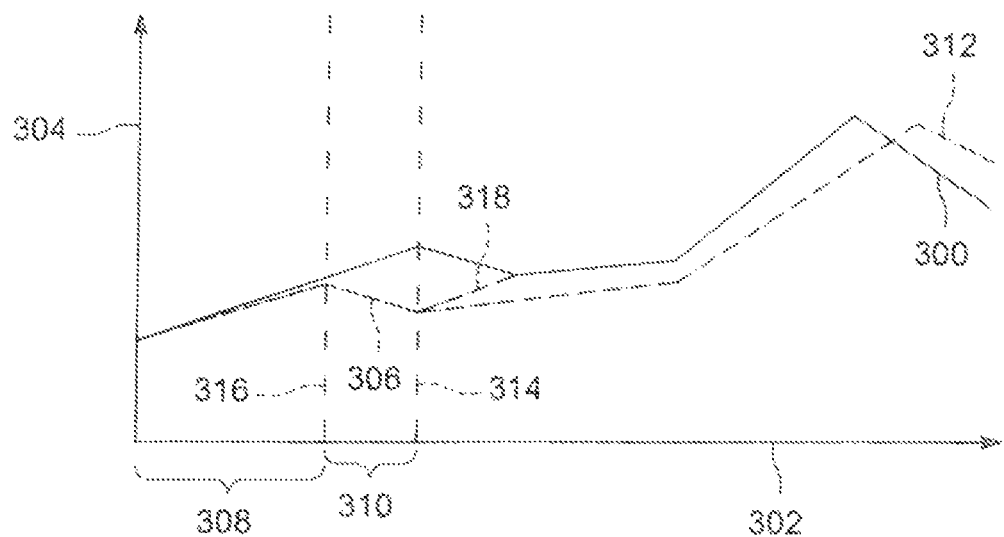
FIG. 3B illustrates operational settings designated by a trip plan for the vehicle system shown in FIG. 1 according to one example.

FIG. 3B illustrates operational settings 300 designated by an automatic control trip plan 324 for the vehicle system 100 (shown in FIG. 1) according to one example. The designated operational settings 300 are shown alongside a horizontal axis 302 representative of time elapsed during the trip and/or distance along the route 102 (shown in FIG. 1) during the trip. The designated operational settings 300 also are shown alongside a vertical axis 304 representative of different operational settings.

Actual operating parameters or conditions 306 of the vehicle system 100 also are shown in FIG. 3B. The designated operational settings 300 and the actual operating conditions 306 may represent similar operations of the vehicle system 100. For example, the designated operational settings 300 can represent designated speeds of an automatic control trip plan 320 while the actual operating conditions 306 represent actual speeds of the vehicle system 100. As another example, the designated operational settings 300 can represent designated accelerations of an automatic control trip plan 324 while the actual operating conditions 306 represent actual accelerations of the vehicle system 100.

During a first time period or distance range 308 of the automatic control trip plan 320, the actual operating conditions 306 of the vehicle system 100 are the same as or approximately the same as the designated operational settings 300 of the automatic control trip plan 320. For example, the actual operating conditions 306 may be within a designated threshold range (e.g., 1%, 5%, 10%, or another value) of the designated operational settings 300 of the automatic control trip plan 320. Subsequent to the first time period or distance range 308, the actual operating conditions 306 begin to deviate from the designated operational settings 300 of the automatic control trip plan 320 by increasing amounts during a second time period or distance range 310.

The actual operational conditions 306 may be compared to the designated operational settings 300 in order to identify differences there between. For example, during the time period or distance range 308, these differences may be relatively small. During the subsequent time period or distance range 310, however, the differences increase and may become relatively large.

During travel according to the trip plan, the vehicle control system 201 may be unable to exactly follow the operational settings designated for the auto regions 324 and/or the manual regions 326 due to change in the operator's alertness For example, if the alertness detection system 214 detects a decrease in the operator's alertness below a designated level or threshold, the trip plan may prohibit or delay a switch between the automated control trip plan 320 and the manual control trip plan 322. Operation of the alertness detection system 214 is described further below.

Figure 4A:
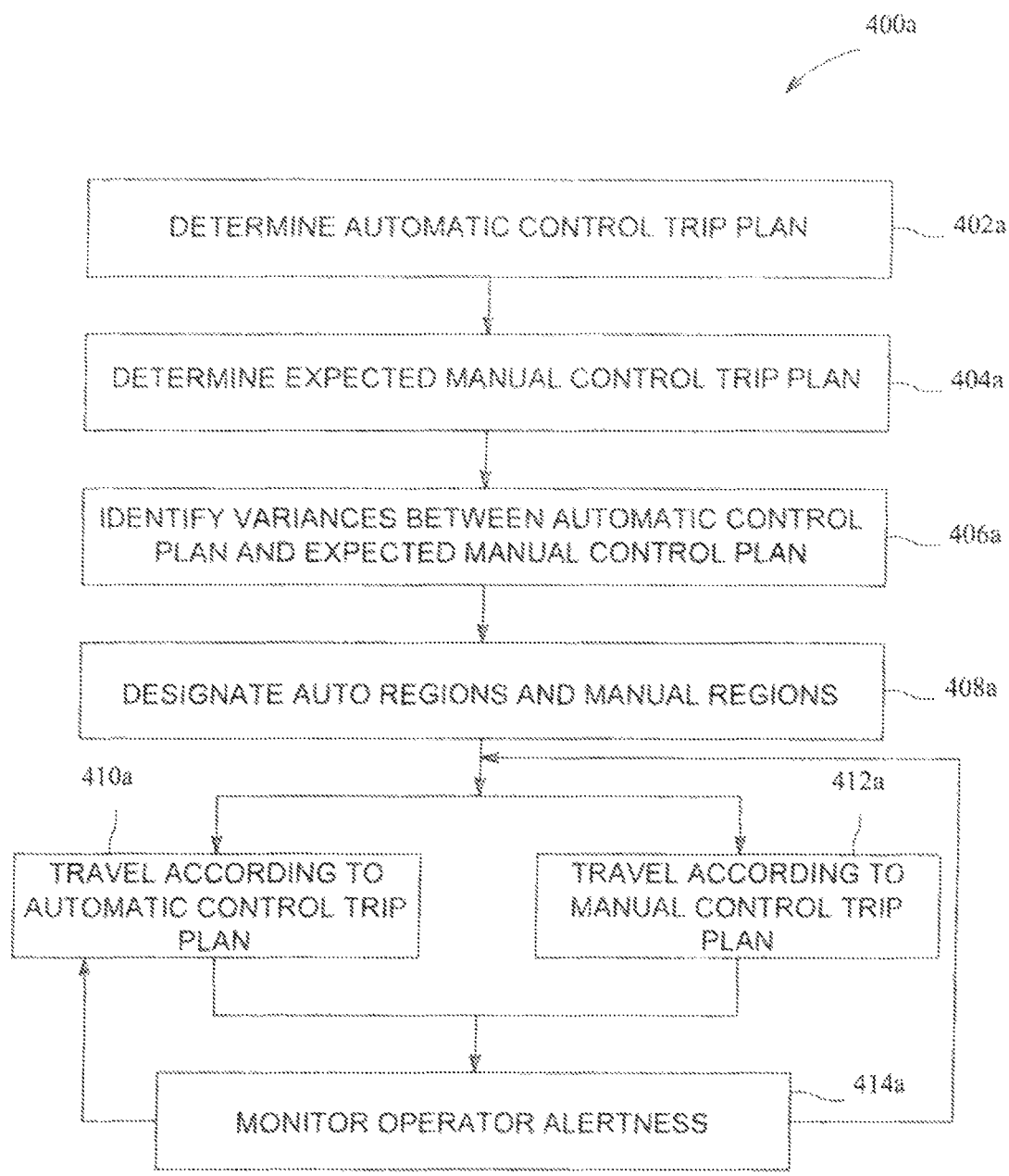
FIG. 4A illustrates a flowchart of a method for determining a trip plan of a vehicle system according to one embodiment.

FIG. 4A illustrates a flowchart of a method 400a for determining a trip plan of a vehicle system 100 according to one embodiment. The method 400a may be practiced by an energy management system 210 and/or controller disposed onboard the vehicle system 100 (shown in FIG. 1) and/or disposed off-board the vehicle system 100. At 402a, an automatic control trip is determined. At 404a an expected manual control trip is determined. The trip plans can be determined at an off-board location, such as a dispatch facility, another vehicle system, an off-board operator control unit (e.g., a handheld remote control), or the like. Optionally, the trip plans may be created and/or determined onboard the vehicle system 100. The trip plans may be created by an energy management system 210 or obtained from a computer readable memory (e.g., a hard drive, flash drive, or the like) that stores previously created trip plans.

At 406a, variances between the automatic control trip plan and the expected manual control plan are determined. At 408a regions along the route 102 are designated as either auto regions or manual regions according to the variances identified in 406a.

In regions designated for the automatic control trip plan 324, at 410 the vehicle system 100 travels by following the automatic control trip plan 324. In regions designated for the manual control trip plan 326, the vehicle system 100 travels by following the manual control trip plan at 412a.

At 414a, the alertness of the operator is monitored by the alertness detection system 214 as the vehicle system 100 travels along the route 102. For example, if the detection system determines that the alertness of the operator has reduced below a predetermined threshold, the vehicle control system 201 can prohibit from following the manual control trip plan at 412a, and maintain following the automatic control trip plan at 410a. Alternatively, if the detection system determines that the alertness of the operator has above a predetermined threshold, the vehicle control system will follow either the automatic control trip plan at 410a or the manual control plan at 412a according to the auto region or manual region as designated at 408a.

Figure 4B:
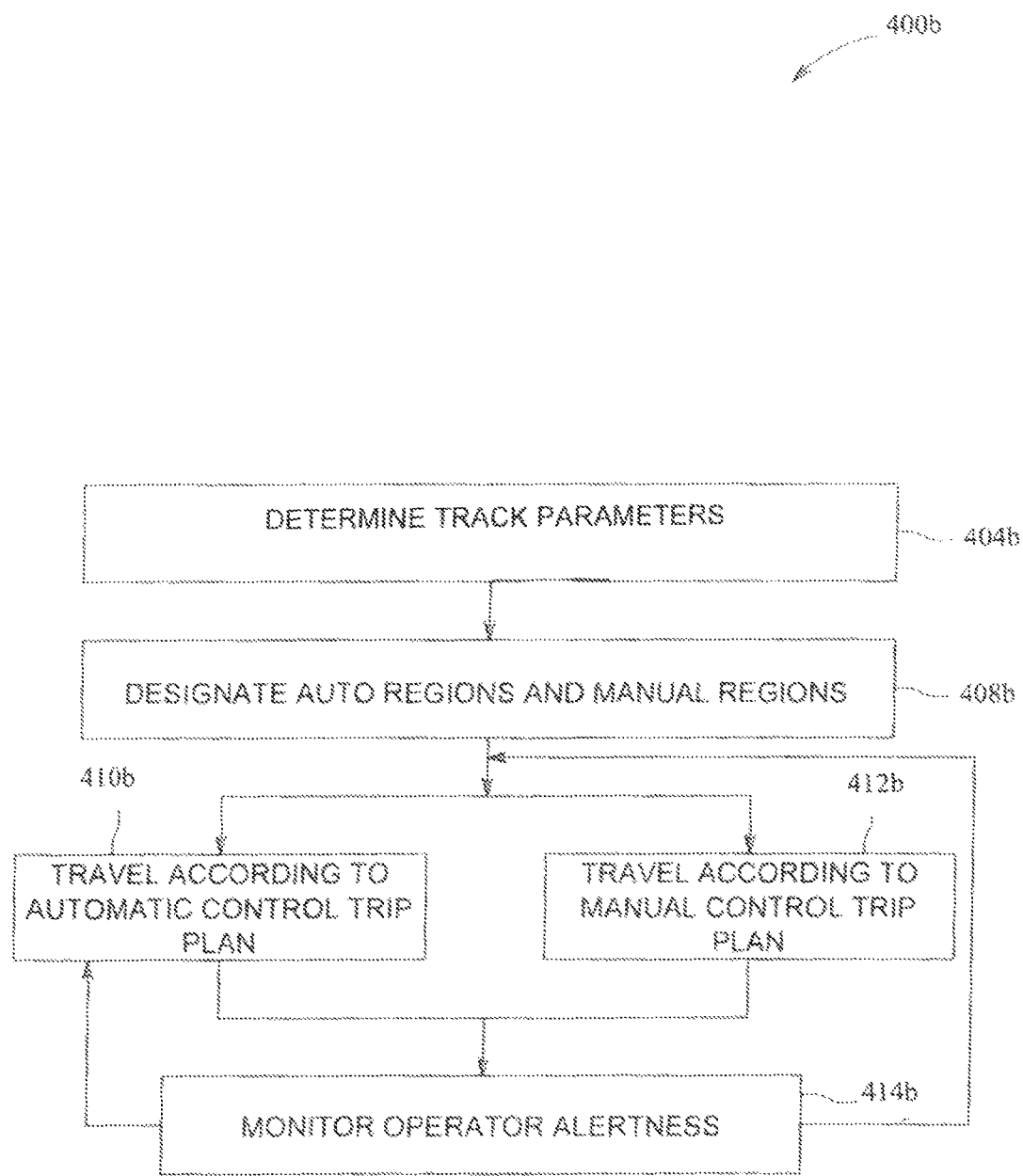
FIG. 4B illustrates a flowchart of a method of determining a trip plan of a vehicle system according to an alternate embodiment.

FIG. 4B illustrates a flowchart of a method 400b for determining a trip plan of a vehicle system 100 as a function of track parameters. The method 400b may be practiced by an energy management system 210 and/or controller disposed onboard the vehicle system 100 (shown in FIG. 1) and/or disposed off-board the vehicle system 100. At 404b track parameters along the route 102 are determined. The track parameters can be determined at an off-board location, such as a dispatch facility, another vehicle system, an off-board operator control unit (e.g., a handheld remote control), or the like. Optionally, the track parameters may be determined onboard the vehicle system 100. The track parameters may be determined by an energy management system 210 or obtained from a computer readable memory (e.g., a hard drive, flash drive, or the like) that stores previously created trip plans.

At 408b regions along the route 102 are designated as either auto regions or manual regions according to the operating conditions determined in 404b. In regions designated as auto regions, the vehicle system 100 travels by following the automatic control trip plan at 410b. In regions designated as manual regions, the vehicle system 100 travels by following the manual control trip plan at 412b.

At 414b, the alertness of the operator is monitored by the alertness detection system 214 as the vehicle system 100 travels along the route 102. For example, if the detection system determines that the alertness of the operator is below a predetermined threshold, the vehicle control system 201 can be prohibited from following the manual control trip plan at 412b, and maintain following the automatic control trip plan at 410b. Alternatively, if the detection system determines that the alertness of the operator is above a predetermined threshold, the vehicle control system will follow either the automatic control trip plan at 410b or the manual control plan at 412b according to the auto region or manual region as designated at 408b.

Figure 4C:
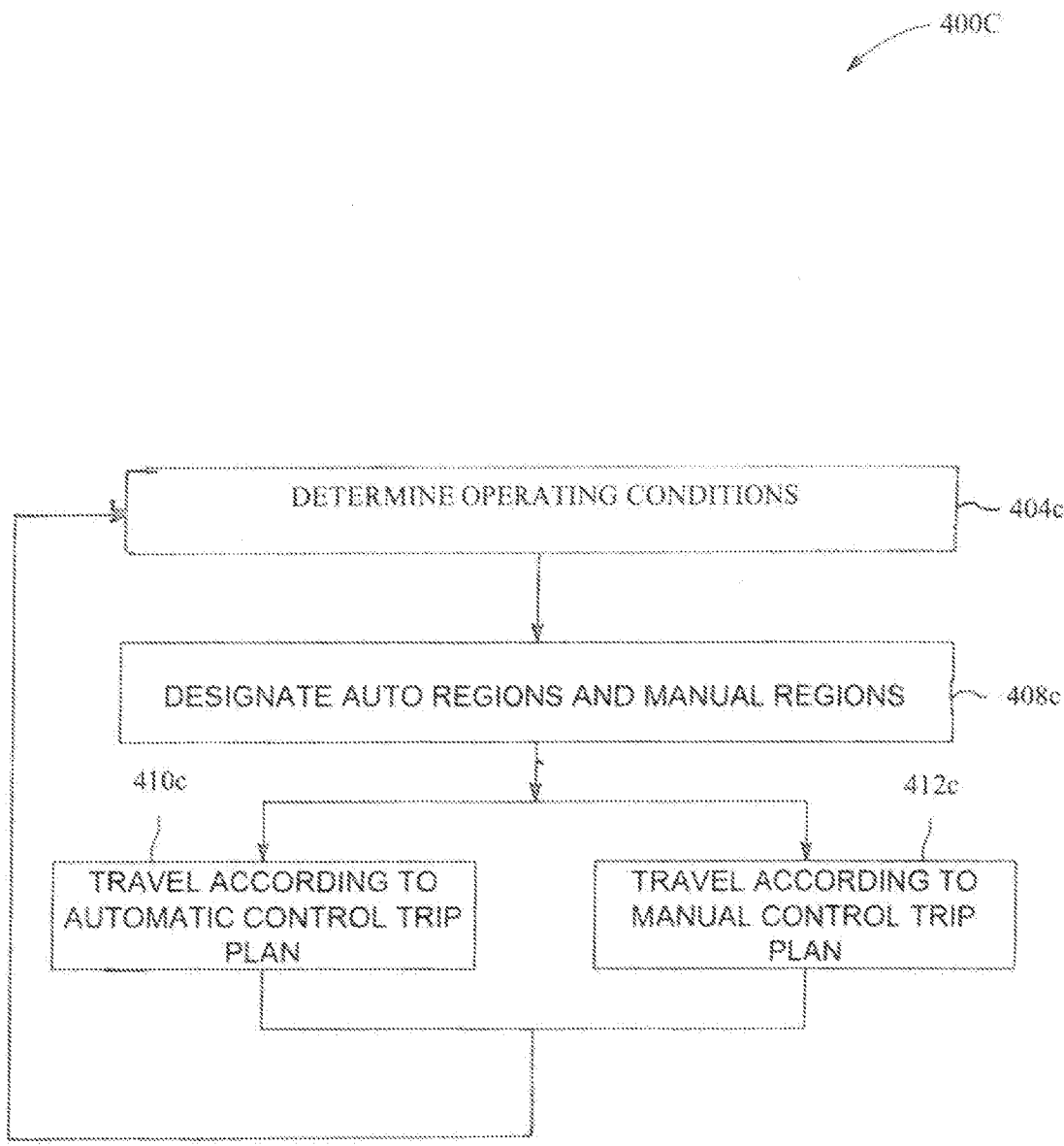
FIG. 4C illustrates a flowchart of a method of determining a trip plan of a vehicle system according to an alternate embodiment.

FIG. 4C illustrates a flowchart of a method 400c for determining a trip plan of a vehicle system 100 as a function of operating conditions or parameters. The method 400c may be practiced by an energy management system 210 and/or controller disposed onboard the vehicle system 100 (shown in FIG. 1) and/or disposed off-board the vehicle system 100. At 404c operating conditions along the route 102 are determined. The operating conditions can be determined at an off-board location, such as a dispatch facility, another vehicle system, an off-board operator control unit (e.g., a handheld remote control), or the like. Optionally, the operating conditions may be determined onboard the vehicle system 100. The operating conditions may be determined by an energy management system 210 or obtained from a computer readable memory (e.g., a hard drive, flash drive, or the like) that stores previously created trip plans.

At 408c regions along the route 102 are designated as either auto regions or manual regions according to the operating conditions determined in 404c. In regions designated as auto regions, the vehicle system 100 travels by following the automatic control trip plan at 410c. In regions designated as manual regions, the vehicle system 100 travels by following the manual control trip plan at 412c. Subsequently, the operating conditions are determined again at 404c. In this way, the operating conditions are continuously monitored and determined during travel along the route. The operating conditions may include operator alertness. In addition, the operating conditions may also include a percentage of the route already traveled under manual control. For example, if travel along the route reaches a predetermined threshold of travel under manual control, such as 20%, the remainder of the route can be de designated as an auto region.

Figure 2:
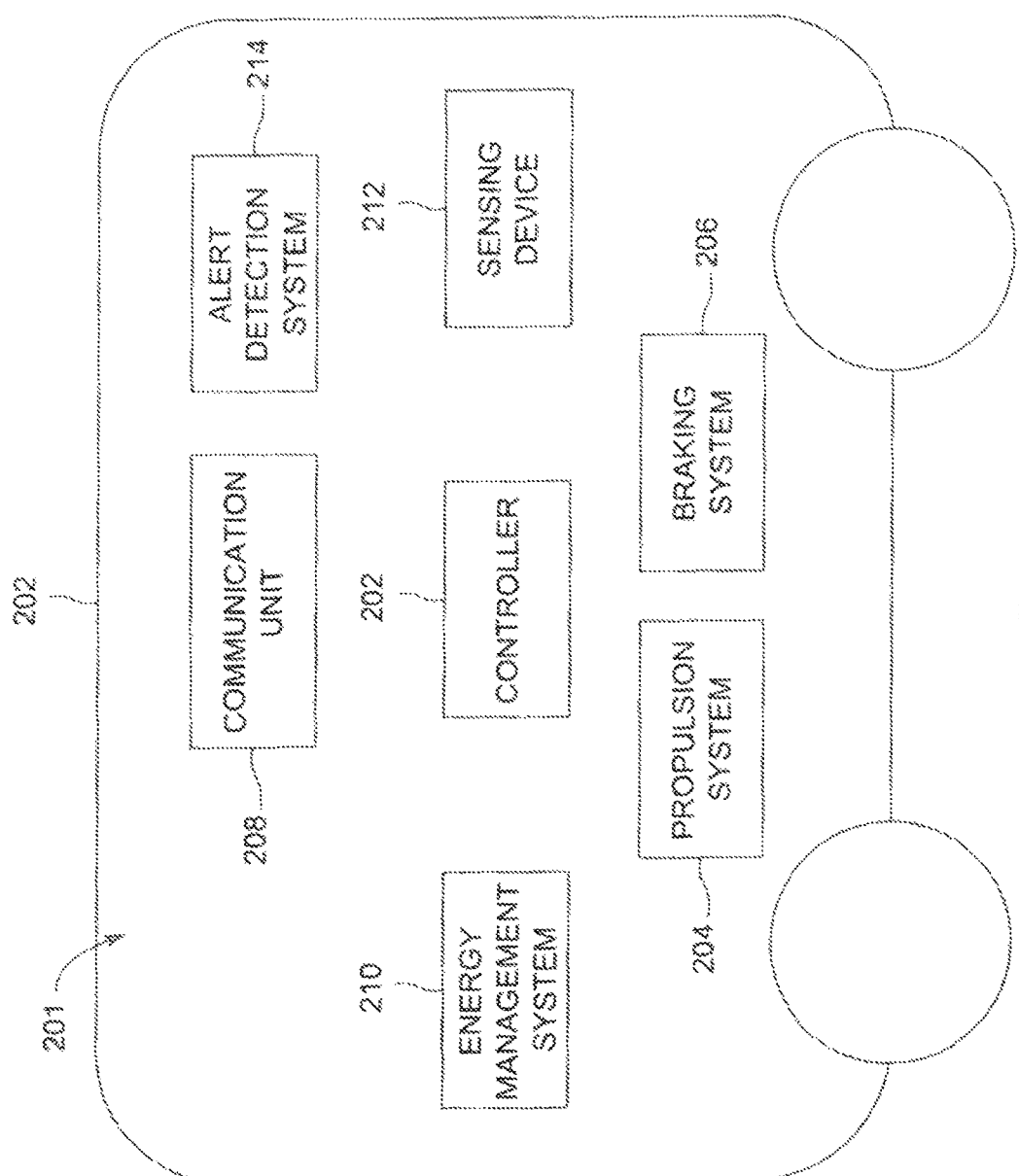
FIG. 2 is a schematic illustration of a vehicle according to one embodiment.

FIG. 2 is a schematic illustration of a vehicle 200 according to one embodiment. The vehicle 200 may represent one or more of the vehicles 108, 110 shown in FIG. 1. For example, the components shown in FIG. 2 as being onboard the vehicle 200 may be disposed onboard two or more different vehicles 108, 110 of the vehicle system 100 shown in FIG. 1.

A controller 202 of the vehicle 200 includes or represents hardware circuits or circuitry that include and/or are connected with one or more computer processors, such as one or more computer microprocessors. The controller 202 can control operations of the vehicle 200 and/or vehicle system 100, such as by autonomously controlling a propulsion system 204 and/or a braking system 206 of the vehicle 200 according to an automatic control trip plan or revised automatic control trip plan, and/or by receiving input from an operator to manually control the propulsion system 204 and/or the braking system 206 according to the manual control trip plan. For example, the controller 202 may represent or include one or more input devices, such as a throttle, pedal, touchscreen, electronic mouse, stylus, microphone, or the like, to receive commands from an operator to control operations of the vehicle 200.

The propulsion system 204 represents one or more components that work to generate tractive effort or power. For example, the propulsion system 200 can represent one or more motors, engines, or the like, that propel the vehicle 200. The braking system 206 represents one or more components that work to slow or stop movement of the vehicle 200, such as airbrakes, friction brakes, or the like.

A communication unit 208 of the vehicle 200 represents hardware circuits or circuitry that include and/or are connected with one or more computer processors (e.g., microprocessors) and communication devices (e.g., wireless antenna and/or wired connections) that operate as transmitters and/or transceivers for communicating signals with one or more locations disposed off-board the vehicle 200. For example, the communication unit 208 may wirelessly communicate signals with a facility and/or another vehicle system, or the like. The communication unit 208 may receive trip plans or revised trip plans from off-board locations and/or may communicate trip plans or revised trip plans to off-board locations.

An energy management system 210 of the vehicle 200 includes or represents hardware circuits or circuitry that include and/or are connected with one or more computer processors, such as one or more computer microprocessors. The energy management system 210 creates and/or revises the operational settings designated by trip plans to form and/or revise the trip plans. One example of an energy management system 210 includes the Trip Optimizer™ system of the General Electric Company, but alternatively may be another type of energy management system.

The energy management system 210 can create and/or revise the automatic control trip plan 320 based on trip planning data, such as trip data, vehicle data, and/or route data. Trip data includes information about an upcoming trip by the vehicle 200 or vehicle system 100. By way of example only, trip data may include station information (such as the location of a beginning station where the upcoming trip is to begin and/or the location of an ending station where the upcoming trip is to end), restriction information (such as work zone identifications, or information on locations where the track is being repaired or is near another track being repaired and corresponding speed/throttle limitations on the rail vehicle), and/or operating mode information (such as speed/throttle limitations on the vehicle system in various locations, slow orders, and the like). Vehicle data includes information about the vehicle 200, vehicle system 100, and/or cargo being carried by the vehicle 200 and/or vehicle system 100. For example, vehicle data may represent cargo content (such as information representative of cargo being transported by the vehicle) and/or vehicle information (such as model numbers, manufacturers, horsepower, and the like, of the vehicle). Route data includes information about the route upon which the vehicle or vehicle system travels. For example, the route data may include information about locations of damaged sections of a route, locations of route sections that are under repair or construction, the curvature and/or grade of a route, and the like. The route data is related to operations of the vehicle as the route data includes information about the route that the vehicle is or will be traveling on. However, other types of data can be recorded as the data and/or the data may be used for other operations. The automatic control trip plans optionally may be referred to as trip profiles or speed profiles, and can be formed in accordance with one or more embodiments described in U.S. patent application Ser. No. 13/545,271, the entire disclosure of which is incorporated herein by reference.

A sensing device 212 of the vehicle 200 represents one or more components that determine (e.g., measure, sense, calculate, estimate, model, or otherwise obtain) the operating conditions of the vehicle 200 and/or vehicle system 100 that includes the vehicle 200. For example, the sensing device 212 can include one or more sensors, such as tachometers, accelerometers, coupler force sensors, global positioning system receivers, air pressure sensors, sensors that detect throttle positions, or the like. These sensors can measure operating conditions of the vehicle system 100 and generate data representative of the operating conditions. Optionally, the sensing device 212 can include hardware circuits or circuitry that include and/or are connected with one or more computer processors (e.g., microprocessors) that are configured to determine the actual operating conditions of the vehicle 200 and/or vehicle system 100 based on a mathematical or physics-based model of the vehicle 200 and/or vehicle system 100. For example, based on relative speeds, locations, and/or accelerations of different vehicles in the vehicle system 100, a spring model, lumped mass model, or other type of model may be used to calculate or estimate the operating conditions of the vehicle system 100 (e.g., coupler forces, slack in the couplers, or the like). As another example, based on measured air pressures in the brake system of the vehicle 200 or another brake system of the vehicle system 100, a hydraulic model of the brake system(s) can be used to calculate or estimate air pressures and/or air flows in one or more locations of the brake system(s) as the operating conditions of the vehicle 200 or vehicle system 100.

This data can be communicated from the sensing device 212 to the controller 202 and/or energy management system 210. The controller 202 can use this data as feedback to determine how to control the vehicle 200 and/or vehicle system 100 in order to follow the automatic control trip plan 320. The energy management system 210 can use this data to determine when to revise the automatic control trip plan 320 and/or to determine the initial operational settings designated by the revised automatic control trip plan, as described herein.

The alertness detection system 214 of the vehicle 200 has one or more processors that are configured to provide a fully contactless imaging system and a physical and psychophysiological (3P) model for estimating operator parameters and conditions including fatigue and drowsiness in real-time. As illustrated in FIG. 5, the imaging system includes a first imaging device that typically is an RGB (Red Blue Green) digital camera, that can be a RGBD (Red, Green, Blue, Depth) camera, and a second imaging device that typically is a thermal camera that both provide data to the one or more processors for creating a physically and psychophysiologically output of the operator in real-time. The one or more processors utilize the data from the RGB camera and thermal camera to passively measure bio-signals emanated, including an operator's face during night or day while the operator is on the job, without asking the operator to indicate vigilance periodically. Thus, alertness detection system 214 is usable during the day or night without additional illuminators depending on imaging device types inside the operator's cabin or surrounding environment, or electrodes affixed to the skin. As a result, this allows for long monitoring functions unobtrusively inside the vehicle.

The first imaging device, while described as a RGB camera, may be of any type, including but not limited to a reflected near infrared (NIR) camera or a shortwave infrared (SWIR) camera. The RGB, NIR and SWIR cameras may be instrumented with suitable illuminators. Similarly, the second imaging device, while described as a thermal camera may of any type, including but not limited to a midwave infrared (MWIR) or a longwave infrared (LWIR) camera which is capable of collecting emitted waves. Other imaging devices of interest suitable for this kind of alerter is ultra-wide band microwave imaging technology. Depth measuring imaging devices such as Kinect, Multi and hyperspectral cameras in the visible and infrared wavelength range are other imaging devices suitable for use in the alerter technology. Any combinations of these imaging devices may be used to extract 3P information about the operator intervention.

Historical data related to physical, physiological or psychophysiological (3P) parameters of the operator in the form of a 3P model is generated through experimentation to be used by the alertness detection system 214. A 3P model is a relationship between features (or indicators) from non-contact sensor data to cognitive indicators derived from body-worn sensor(s) data responsible for fatigue and alertness. During experiments, an imaging system provides data related to visible physical characteristics (i.e., physical indicators) of the operator. These include, but are not limited to, sagging posture, leaning of head, head nods, gaze direction, expressions, eye-ball motions, pose, gestures, blinking, yawning, and the like.

During experiments, psychophysiological indicators such as pulse rate, respiration rate, heart rate variability, peak-to-peak pulse locations, power in harmonics, knowledge-based/shallow/deep learning features are generated from blood flow data coming from below the skin and can be measured using imaging devices as well as with body-worn devices well-known to the medical community, including: electroencephalographic (EEG), photoplethysmographic (PPG), videoplethysmographic (VPG), electrocardiographic (ECG), ballistocardiographic (BCG), electromyographic (EMG), phonocardiographic (PCG), galvanic skin response (GSR), transcranial Doppler (TCD) sonography, and functional near infrared (fNIR) signals.

During experiments conducted offline in a controlled setting, data from body-worn devices is used not only to validate the measurements from non-contact imaging-based systems, but also are used to extract well-known psychological indicators such as fatigue and drowsiness from EEG signals. Physical characteristics (i.e., physical indicators) are largely associated with the above surface indicators, and can be obtained with imaging devices such as RGB and/thermal imaging device. Combining a subset of both measurements in one device has the potential to provide very accurate results.

While these experiments are occurring the corresponding 3P changes detected by the imaging devices are compared to the psychological parameters that are measured and collected in the form of fatigue and drowsiness. Mathematical modeling is then utilized to construct a 3P model that associates the images and data from images generated by one or more imaging systems (e.g., features) to the corresponding psychological effects experienced by an operator. Health effects of the operator are obtained from measurements such as pulse rate, respiration rate, peak-to-peak pulse locations, and the like. The alertness detection system 214 utilized on the vehicle 200 is then able to detect physical and physchophysiological (3P) changes of an operator using a 3P model based on the images which is developed from human experiments in a controlled laboratory setting. These 3P changes are monitored in real-time without requiring intervention by the operator.

For example, the 3P changes of the operator may be monitored without requiring the operator to actuate a button or switch, provide an answer to a query or test, keep weight on a kill switch, or the like. Because images from the imaging devices contain health parameters, they are also monitored over time. In this manner health parameters as well as psychological parameters, fatigue and drowsiness, are measured unobtrusively and without operator intervention over time or at regular intervals or as and when required while operating the train. In particular, the alertness detection system 214 takes data generated and utilizes an algorithm or look up tables to determine the health parameters of the operator. In this manner, the alertness detection system 214 is a contactless and a passive monitoring system with abilities to record 3P data of the operator inside the cabin at all times without additional illumination depending on the type of imaging device used.

The alertness detection system 214 allows predictive capabilities to be incorporated to provide early warning of impending danger to a vehicle such as a locomotive as a result of operator error. Additional performance hindering behavioral states such as texting, operational compliance functions, and situational awareness external to the cabin is recognized from image analytics and combined with 3P quantities to provide more advanced capabilities. In addition, the alertness detection system 214 can be used to perform postmortem analysis in the event of accidents.

The alertness detection system 214 is unobtrusive and based on physiological cues rather than only behaviors as indicated by physical characteristics, and uses task-relevant knowledge of expected behaviors and workload. The system 214 measures psychological data that includes data related to fatigue and drowsiness and other operator based parameters with advanced capabilities. For example, with highly sensitive thermal imagery of the operator's face, one can extract additional information associated with psychophysiology (e.g., emotion, joy, arousal etc.,) by monitoring thermal changes in regions such as nose, cheeks, periorbitall-supraorbital regions, forehead, maxillary, neck-carotid, lips/mouth and the like.

Figure 6:
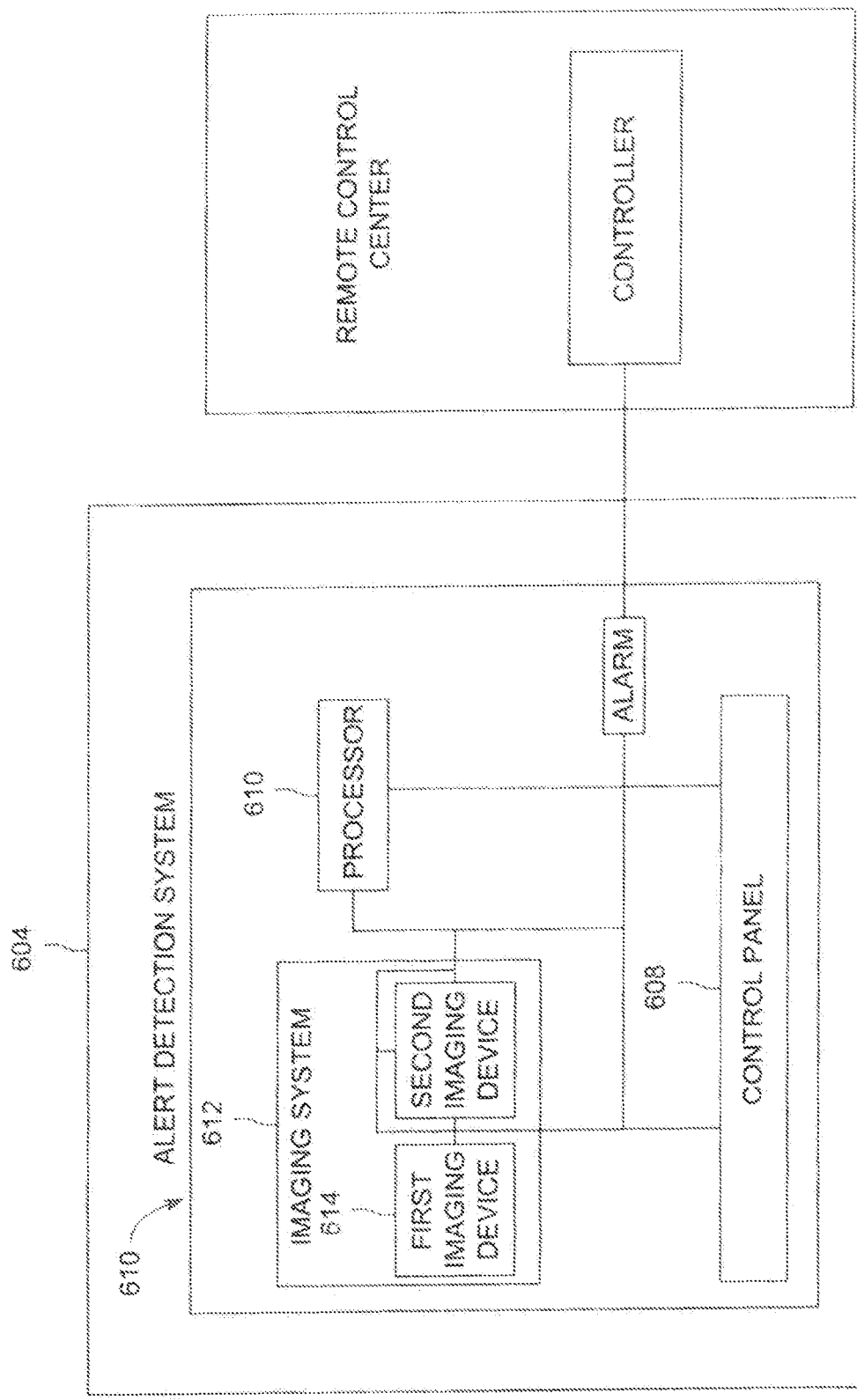
FIG. 6 is a schematic diagram of the alertness detection system of FIG. 5.

FIGS. 5 and 6 are schematic diagrams showing features of one embodiment of the alertness detection system 214 for monitoring an operator 502 of a vehicle 200. The vehicle 200 has a controller 608 used by the operator 502 for controlling the vehicle 200 based on inputs of the operator 502. The controller 108 can represent hardware circuitry that includes and/or is connected with one or more processors (e.g., one or more microprocessors, field programmable gate arrays, and/or integrated circuits) that generate control signals that are communicated to propulsion systems, brake systems, and/or output devices to control movement and other operations of the vehicle 200. The alertness detection system 214 also includes one or more processors 610 configured to store, receive and transmit data, including but not limited to 3P model, historical data and real-time data. The alertness detection system 214 is configured to make calculations utilizing algorithms and store look up tables therein to generate 3P outputs related to the operator 502.

An imaging system 612 is also part of the alertness detection system 214 and is in communication with the one or more processors 610 to provide real-time data related to the operator 502 to the one or more processors 610. The imaging system 612 in one embodiment includes a first imaging device 614 that is a RGB camera and continually records digital images of the operator 502. The first imaging device 614 generates pixel based data in real-time that is continuously communicated to the one or more processors 610. In this embodiment a second imaging device 616 is also provided that is a thermal camera. Specifically, the thermal camera generates thermal based data related to the operator 502 in real-time that is also continuously communicated to the one or more processors 610.

As both reflective and IR images contain information above and below the skin surface, based on the feature extraction one or more processors use a 3P model to obtain operator health parameters such as heart rate, respiration rate, fatigue and drowsiness levels and operator based physical indicators. The psychophysiological features obtained from blood volume waveform extracted from imaging devices such as RGB device are: blood oxygen saturation, tidal respiration rate, a Poincare Plot of peak-to-peak pulse dynamics, a pulse harmonic strength, power in harmonics of cardiac frequencies, heart rate variability, pulse rate, pulse amplitude, statistical features and key salient transition points on the waveform. The alertness detection system 214 thus uses the RGB and additionally thermal imaging system to extract various physical cues/features such as specific micro-expression associated with nuanced muscle movement, macroexpressions, eye closure (blink-rates), head nodding, and yawning. Motion signatures are obtained by computing space-time corners or interest points. The physical and psychophysiological features from the imaging system computed in one of the processors are then used in the 3P model to determine fatigue and drowsiness levels. While some of the psychophysiological features have health information, in this manner the operator is monitored for both 3P as well as health conditions for determining attentiveness of the operator at controlling the vehicle.

The RGB and thermal image of a subject face are taken simultaneously with the co-located imaging devices of the imaging system. Then, a pre-computed transformation (a homography) is used to warp the thermal image onto the RGB image. This results in a new joint image where each pixel has R, G, B, and T values. The production of such imagery allows subsequent algorithms to make determination related to alerting the operator and operating the vehicle 200.

Image alignment is then achieved via forward and back projection. For example, given a stream of RGBT images, facial landmarks such as the corners of the eyes and mouth as well as the contour of the face is automatically fitted to each image. This allows for a warping of the RGBT image into a canonical frontal view. In this manner the imagery is normalized. Therefore, pixels from different normalized images are assumed to be in correspondence.

In addition to the analysis of images in isolation, temporal features such as optical flow are incorporated directly into the image representation. In addition, a Bayesian framework is constructed by considering the probability of observing a given facial cue that have been observed during prior observations within the historical data. In particular, full facial regions are taxonomized from thermal images into action units and subcutaneous temperature of the action units are extracted as thermal features. Other historical data such as physical anthropometric data and age are also utilized in determining operator health parameters and modeling.

In another embodiment, the alertness detection system 214 is in communication with a remote alertness detection system that can be at a control center and operated or monitored by a third party. Upon receiving communication from the alertness detection system 214 of a potential health and/or alertness condition of an operator, the third party can contact the operator 102 directly or monitor the vehicle remotely to ensure proper operation of the vehicle. The alertness detection system 214 either automatically or through remote actuation also controls the vehicle 200 to brake the vehicle 200 and stop the vehicle 200 based upon the health related conditions of the operator monitored by the imaging system 612. The alertness detection system 214 may also provide prompts to the operator 502 such as math questions or otherwise to attempt to gather additional health information regarding the operator through requested operator inputs before braking or stopping the vehicle. Similarly, the alertness detection system 214 can increase cognitive action through requested cognitive inputs such as solving simple problems to prevent sleepiness, drowsiness and fatigue prior to stopping the vehicle. Alternatively, the alerting system 520 can make recommendations for the operator of the vehicle again to prevent sleepiness, drowsiness and fatigue, to combat cognitive and health related conditions, or to ensure the attentiveness of the operator.

Thus, the alertness detection system 214 utilizes the parameters provided in historical data, including a 3P model such that when the imaging system is monitoring an operator in real-time, the information received by the imaging system 612 is used to compute physical and psychophysiological features. Once the features are computed, a 3P model is executed in real-time to determine whether an operator is fatigued, sleepy, sleeping, stressed, under duress, incapacitated, distracted or the like. Responsive to the real-time results from 3P features and output of 3P model, the alertness detection system 214 can alert the operator, remote third party or both with an alarm or can operate the vehicle through braking or stopping the vehicle depending upon the 3P and/or health conditions monitored by the alertness detection system 214.

Figure 7:
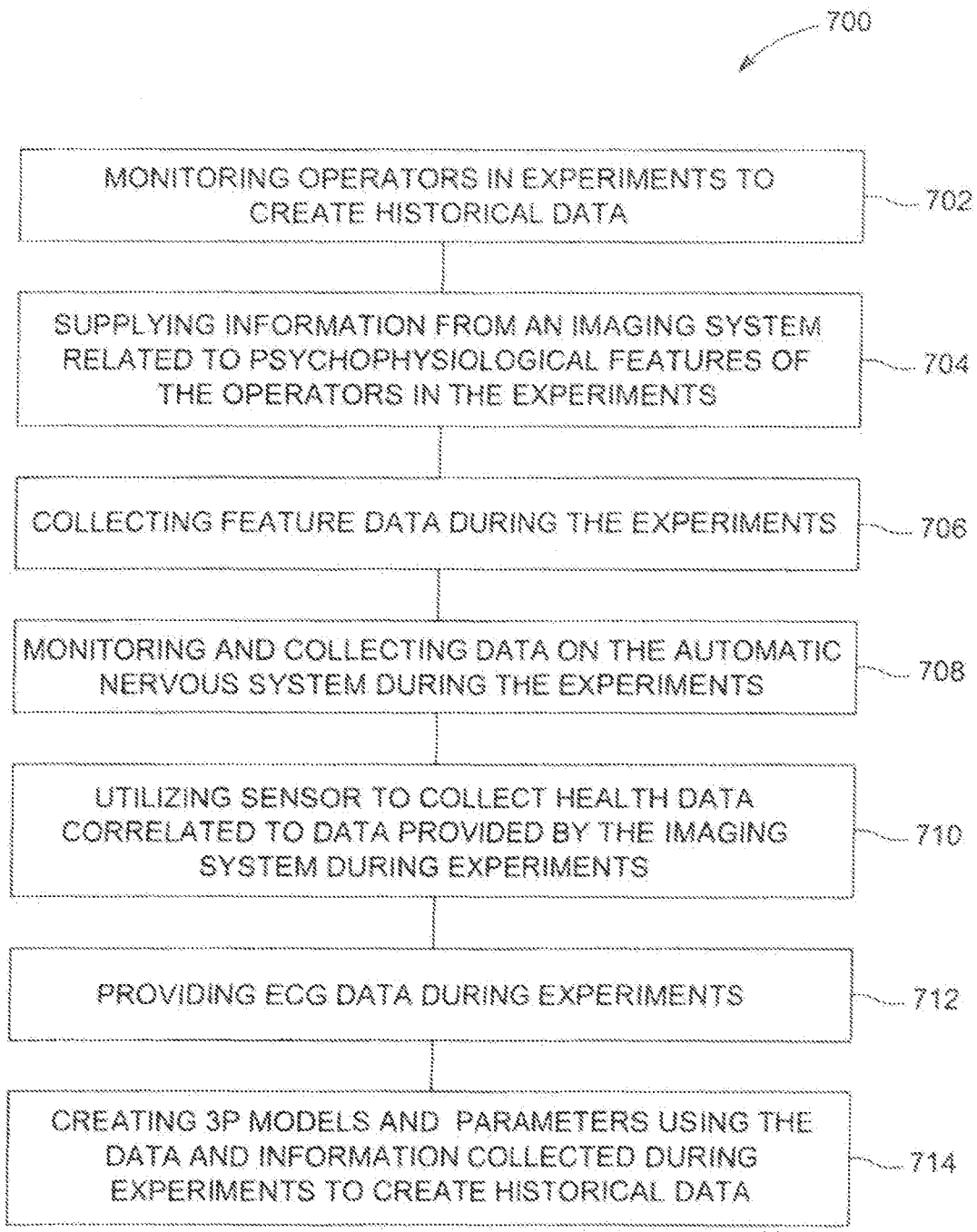
FIG. 7 illustrates a flow chart of a method of forming historical data for an alertness detection system.

FIG. 7 illustrates a flowchart of one embodiment of a method 700 of forming historical data and a 3P model to be used by the alertness detection system 214 for monitoring the operator. At 702, in experiments, operators operating a vehicle are placed under a similar stressed environment in a controlled setting (e.g., a locomotive simulator) and are monitored with both an imaging system and physical body-worn sensors, including but not limited to electroencephalographic (EEG), photoplethysmographic (PPG), videoplethysmographic (VPG), electrocardiographic (ECG), ballistocardiographic (BCG), electromyographic (EMG), phonocardiographic (PCG), galvanic skin response (GSR), transcranial Doppler (TCD) sonography, and functional near infrared (fNIR) signals. The sensors can be passive or non-passive, and measurements are taken simultaneously with the images from the imaging system, including, but not limited to thermal images and digital images of the operator. To obtain a 3P model from the experimental data, the data is converted to meaningful features that correlate to physical and psychophysiological features. These features are used in a data driven parameterized mathematical model to estimate fatigue and drowsiness scores among other parameters to provide historical data for the alertness detection system 214. A well-known feature engineering methodology is incorporated to extract well-correlated features from the imaging devices to psychological indicators such as power spectrum in delta, theta, alpha, beta, and gamma bands, which indicates fatigue and drowsiness.

At 704, psychophysiological features extracted from contactless sensors are also supplied by the imaging system during the experiments used to create the historical data. Both reflective and IR video images contain information above and below the skin surface, and their spatial relations are useful for detecting psychophysiological features. In general terms, psychophysiological features that can be obtained from blood volume (BV) waveform, includes, but is not limited to tidal respiration rate, peak-to-peak dynamic periods, a pulse harmonic strength, power in harmonics of cardiac frequencies, heart rate variability (HRV), pulse rate, pulse amplitudes, statistical features, key salient transition points on the waveform, and the like.

At 706, during the experiments to create the historical data for the alertness detection system 214, the feature data collection, additional knowledge-based, shallow, and deep learning features are similarly collected and engineered. For example, a blood volume (BV) pulse signal is obtained from facial RGB videos. This is accomplished either by using model-based removal of signals due to specular mirror-like reflections from the skin surface or by post-processing using multi-band physiologic filters. The respiration rate is obtained from videos using one of three approaches; facial videos from blood volume waveform, measurement of motion-induced respiration, and nasal air flow with thermal images.

The HRV quantifies fluctuations in the interval between heartbeats, attributed to the continuous changes in the vago (parasympathetic)-sympathetic balance. In this manner the autonomic nervous system (ANS) is extracted from sensors at 308. The ANS regulates functions of internal organs and is one of the psychophysiological features used as historical data for obtaining the 3P models used by the alertness detection system 214. As an example of how monitoring the interval between heartbeats can be used to monitor an operator, if the monitored sympathetic tone is more dominant, it increases the heart rate, puts the body in "fight-or-flight response," a physiological reaction that occurs in the presence of something that is stressful, terrifying-either mentally or physically. Alternatively, and in opposite, increased parasympathetic stimulation lowers the heart rate, resulting in low energy and a desire to be at rest. Therefore, an indicator of feeling tired and drowsy as is the case after a meal is presented. While, HRV has historically been obtained from ECG and contact PPG signals; an operator or individual is monitored to provide historical data such that the RGB and T data is utilized to determine such fluctuations. Alternatively, HRV statistics can be extracted from BV waveform, again based on data collected from an imaging system. Thus, many methods can be used to utilize the imaging system to provide historical data for modeling related to the health of the operator.

Alternatively, historical data for the alertness detection system 214 is created by utilizing sensors, such as the contact-PPG, that provides a much cleaner BV waveform, pulse rate, respiration rate, and HRV that are correlated to those obtained from the imaging device outputs at 710. At 712, ECG data is also used to provide data for modelling and is used to confirm PPG measurements. Similarly, EEG recordings show changes correlated with cognition (fatigue and drowsiness). A frequency spectrum of EEG signals is typically divided into five groups: delta signals (<4 Hz) being the slowest waves are usually correlated with sleep; theta signals (4-7 Hz) are associated with drowsiness; alpha waves (7-15 Hz) are related to relaxation; beta waves (15-30 Hz) are mostly related to active thinking and a high-level of alertness; gamma signals (>30 Hz) are related to perception of external stimuli such as sound and images with a high cognition level. Thus, power spectrum in delta, theta, alpha, beta, and gamma bands act as good indicators of psychophysiological activities (i.e., ground truth) for developing the model for estimating state-of-mind using features extracted from the imaging system while operating the train.

Once features are engineered, a subset of, well-correlated features from the imaging system are compared to psychological indicators to construct an input-output model to be used as historical data at 714. The vector of 3P features is fit to a plurality of models. The 3P model is an input/output (I/O) model which receives a vector of physical and physiological features and generates, as output, psychological quantities. The 3P model is comprised of a plurality of fitting functions, and may be developed with basis functions, which are aggregated to obtain outputs. Parameters of the model are fitted to a training data set using conventional least squares or sparse optimization methods.

Figure 8:
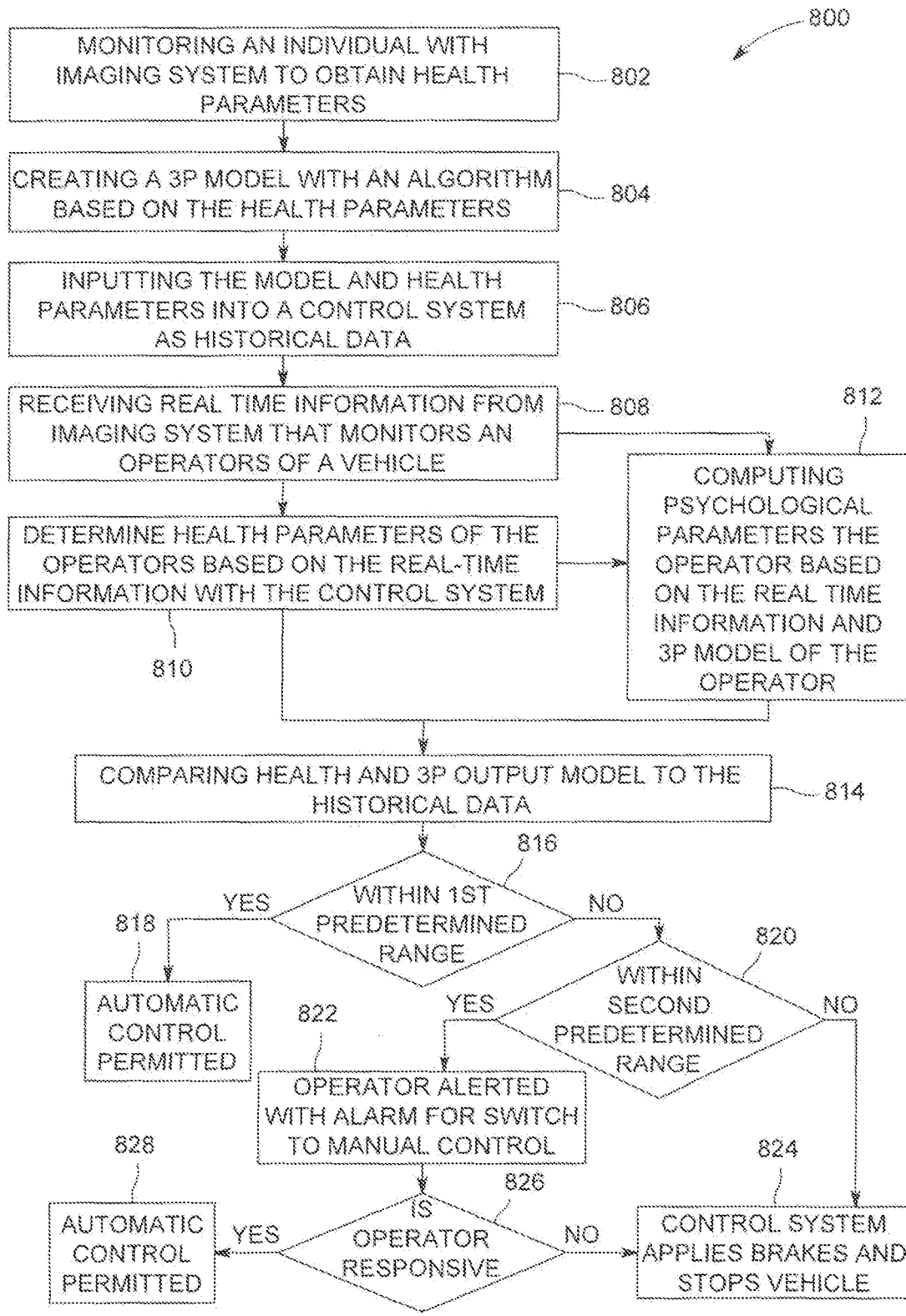
FIG. 8 illustrates a flow chart of a method for monitoring an operator of a vehicle.

FIG. 8 shows a method for alerting an operator 800. At 802, an individual is monitored by an imaging system and sensors during conditions similar to operating a vehicle to obtain physical, physiological and psychological parameters under predetermined stress conditions. The imaging system can include a first imaging device that is a RGB digital camera and a second imaging device that is a thermal camera. Other imaging devices described above can also be used during the creation & use of 3P model. At 804, the physical, and psychological parameters are utilized with an algorithm to form a 3P model of an operator. At 806, the model and health based parameters are inputted into an alertness detection system 214 of a vehicle as historical data.

At 808, the alertness detection system 214 receives real-time information from an imaging system that monitors an operator of the vehicle. The imaging system can include a first imaging device that is a RGB digital camera and a second imaging device that is a thermal camera. In other embodiments, other imaging devices are utilized as discussed above. At 810 the alert detection system 214 determines physical, physiological and psychological features or parameters from the real-time information received from the imaging system. Optionally, at 812, the alert detection system 214 uses these features to compute health and psychological (fatigue and drowsiness) conditions from 3P model of the operator based upon the real-time information received from the imaging system or from the physical, physiological and psychological parameters determined by the alertness detection system 214.

At 814, the real-time 3P model output and health parameters, are used to compare the health and psychological condition of the operator to the inputted historical data. At 816, if during the comparison at 814 the output parameters of 3P model fall within a first pre-determined range, then no alert is provided at 818 and automatic control is permitted. At 820, if during the comparison at 814 the parameters or output of 3P model do not fall within the first pre-determined range, a decision is made whether they fall within a second pre-determined range that indicate an operator health related issue and is presented to the alertness detection system 214 which then alerts the operator by actuating an alarm at 822 and switching or transferring back to manual control by the operator if the system was in an automatic control mode. Examples of such operator health related issues that would cause a parameter or the output of 3P model to fall with the second pre-determined ranges includes, but is not limited to, head nodding indicating fatigue or drowsiness, head or eye movement away from the front of the vehicle indicating distracted driving, increased heart rate, irregular beats as in atrial fibrillation or breathing indicating potential sickness or emergency condition, or the like.

At 820, if the parameters or output of 3P model do not fall within the second pre-determined range that indicates a serious operator health related issue and the control system brakes or stops the vehicle at 824. Examples of such operator health related issues include extreme increase in heart rate, irregular heartbeats, stoppage of breathing, extreme fluctuations in facial temperature, delayed cognitive responses or other indication that the operator is incapacitated, intoxicated or experiencing a severe health condition.

Similarly, if the alarm is actuated at 822 the operator must take manual control of the vehicle system at decision point 826. If the operator's health and psychological parameters improve (i.e. they fall within the $1^{st}$ predetermined range), the system allows automatic control at 828. If the operator is not responsive the alert detection system 214 brakes or stops the vehicle again at 824.

As an example of how the method of FIG. 8 works, after the physical, physiological and psychological parameters under predetermined stress conditions in a controlled environment are obtained and/or the operator model determined, the imaging system continuously monitors the operator of a vehicle using real-time data. In this example a RGB digital camera provides information that the operator starts to blink their eyes significantly more often than compared to the physical, physiological and psychological parameters provided for in the historical data and/computed from the 3P model using real-time data. The imaging system also provides that the operator's eyelids remain closed longer than a typical blink also within the historical data. As a result of these conditions or parameters, the alertness detection system 214 actuates its alarm to alert the driver that he is becoming fatigued and the energy management system 210 initiates a transition to manual control. A message is also communicated remotely to an operations center to alert a third party that the driver is fatigued.

As yet another example, both physical and psychophysiological features from the imaging devices are extracted from real-time data and used as input to the multivariate 3P model to generate the output such as the psychological state of the operator (i.e., fatigue and drowsiness levels). If the fatigue and drowsiness levels exceed the predetermined limit as indicated in the historical data, then the alertness detection system 214 actuates its alarm to alert the driver that he is becoming fatigued and the energy management system 210 initiates a transition to manual control.

As another example, a thermal camera of the imaging system detects that the face of the operator becomes flushed, indicating an increased heart rate. Based on the sudden increase of heat of the operator the alert detection system 214 alerts a remote operations center that the operator is experiencing an increased psychophysiological state (e.g., heart rate or heart rate variability). An individual at the remote operations center then contacts the operator to check their status while the alarm is actuated by the alertness detection system 214 and the vehicle operator is requested to provide input into the alert detection system 214. When the vehicle operator is unresponsive and unable to provide input, the alert detection system 214 switches control of the vehicle to the automatic control trip plan or stops the vehicle.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, communication unit, control system, etc) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

Changes can be made in the above constructions without departing from the scope of the disclosure, it is intended that all matter contained in the above description or shown in the accompanying drawings shall be interpreted as illustrative and not in a limiting sense.

The invention claimed is:

1. A vehicle system, comprising:
one or more processors configured to determine one or more permissible regions of a trip where the vehicle system is permitted for automatic control, the one or more permissible regions of the trip determined based on one or more of parameters of a route, a trend of operating parameters of the vehicle system, or a first trip plan that designates one or more operational settings of the vehicle system at one or more different locations, one or more different times, or one or more different distances along a route;
wherein the one or more processors also are configured to actuate an alarm and alert an operator of the vehicle system, and further to control transition of the vehicle system between manual control and the automatic control in the one or more permissible regions by one or more of automatically switching between the manual control and the automatic control or modifying one or more conditions on which the transition occurs, based on at least one of: the operator's response to the alarm or the operator's lack of response to the alarm,
wherein the one or more processors are configured to determine an expected manual control trip plan that designates the one or more operational settings of the vehicle system at the one or more different locations, different times, or different distances along the route to cause the vehicle system to travel at an upper speed limit of the route to be traveled by the vehicle system,
wherein the one or more processors are configured to determine a reduced fuel consumption plan that designates the operational settings of the vehicle system at the one or more different locations, different times, or different distances along the route to cause the vehicle system to consume less fuel than the expected manual control trip plan; and
wherein the one or more processors are configured to determine the one or more permissible regions by identifying where a speed difference of the vehicle system between traveling according to the expected manual control trip plan and traveling according to the reduced fuel consumption plan is reduced relative to the route.

2. The system of claim 1, wherein the one or more processors are configured to determine the one or more permissible regions of the trip based on one or more of the parameters of the route that include one or more of a speed limit, a grade, a curvature, wayside information, a cant, notch changes, terrain characteristics, historical alertness data, or transitions in speed limits.

3. The system of claim 1, wherein the one or more processors are configured to determine the one or more permissible regions of the trip based on the trend of the operating parameters of the vehicle system that include one or more of the operational settings of the vehicle system, operator alertness, fuel efficiency, weather conditions, terrain, or availability of independent distributed power.

4. The system of claim 1, wherein the one or more processors are configured to determine one or more permissible regions by determining an alertness of the operator of the vehicle system.

5. The system of claim 1, wherein the one or more processors are configured to determine the one or more permissible regions by determining throttle settings of the vehicle system at the one or more different locations, different times, or different distances along the route and identifying one or more first locations of the different locations where changes in the throttle setting of the vehicle system are smaller than one or more other second locations of the different locations.

6. The system of claim 1, wherein the one or more processors are configured to determine a threshold of one or more of the parameters of the route, the operating parameters of the vehicle system, or trip parameters; and wherein the one or more processors are configured to prohibit switching operation from manual control of the vehicle system to automatic control of the vehicle system if the threshold of the one or more parameters of the route, the operating parameters of the vehicle system, or the trip parameters is exceeded by the corresponding parameters of the route, the operating parameters of the vehicle system, or the trip parameters.

7. The system of claim 1, wherein the one or more processors are configured to determine a threshold of one or more of the parameters of the route, the operating parameters of the vehicle system, or trip parameters; and wherein the one or more processors are configured to switch operation from automatic control of the vehicle system to manual control of the vehicle system if the threshold of the one or more parameters of the route, the operating parameters, or the trip parameters is exceeded by the corresponding parameters of the route, the operating parameters of the vehicle system, or the trip parameters.

8. The system of claim 1, wherein the one or more processors are configured to determine the one or more permissible regions by determining one or more terrain characteristics at one or more of the different locations, different times, or different distances along the route, and by identifying one or more locations of the different locations where changes in one or more of the terrain characteristics of the route traveled by the vehicle system are reduced relative to one or more other locations of the different locations.

9. The system of claim 1, wherein the one or more processors are configured to determine the one or more permissible regions by determining throttle settings of different propulsion-generating vehicles of the vehicle system at one or more of the different locations, different times, or different distances along the route, and by identifying one or more locations of the different locations where changes in the throttle settings of the vehicles are smaller than one or more other locations of the different locations.

10. A method of comprising:

determining trip plans including an automatic control trip plan and an expected manual control trip plan based on one or more parameters of a vehicle system, the expected manual control trip plan designating an operational setting of the vehicle system at one or more different locations, different times, or different distances along one or more routes to cause the vehicle system to travel at an upper speed limit of the one or more routes to be traveled by the vehicle system;

determining a region of a trip where a difference between the fuel consumed by manual control of the vehicle system and fuel consumed by automatic control of the vehicle system is reduced based on the one or more parameters of the vehicle system, wherein the region is determined by determining a reduced fuel consumption plan that designates the operational setting of the vehicle system at the one or more different locations, different times or different distances along the one or more routes to cause the vehicle system to consume less fuel than the expected manual control trip plan; and responsive to the one or more of the parameters or the region of the trip that are determined, actuating an alarm to alert an operator of the vehicle system and switching control of the vehicle system from automatic control to manual control.

11. The method of claim 10, further comprising:

determining the region by identifying where a speed difference of the vehicle system between traveling according to the expected manual control trip plan and traveling according to the reduced fuel consumption plan is reduced relative to the route.

12. The method of claim 10, wherein the trip plan designates throttle settings of the vehicle system at the one or more different locations, different times, or different distances along the one or more routes, wherein the vehicle system travels along the one or more routes according to the trip plan, and wherein the region where the difference in fuel is reduced is determined by identifying one or more first locations of the different locations where changes in the throttle setting of the vehicle system are smaller than one or more other second locations of the different locations.

13. The method of claim 10, further comprising:

determining a decrease in an alertness of the operator based at least in part on output provided by an alert detection system that monitors the alertness of the operator.

14. A vehicle control system comprising:

one or more processors configured to determine operating parameters of a vehicle system and to designate one or more permissible regions for either automatic control or manual control of the vehicle system, wherein the one or more processors also are configured to determine an expected manual control trip plan that designates an operational setting of the vehicle system at one or more different locations, different times, or different distances along one or more routes to cause the vehicle system to travel at an upper speed limit of the one or more routes to be traveled by the vehicle system, wherein the one or more processors also are configured to determine a reduced fuel consumption plan that designates the operational setting of the vehicle system at the one or more different locations, different times, or different distances along the one or more routes to cause the vehicle system to consume less fuel than the expected manual control trip plan, wherein the one or more processors are configured to identify where a speed difference of the vehicle system between traveling according to the expected manual control trip plan and traveling according to the reduced fuel consumption plan is reduced relative to the route;

wherein the one or more processors also are configured to actuate an alarm to alert an operator of the vehicle system and switch control of the vehicle system from automatic control to manual control based on the operating parameters that are determined, wherein the one or more processors also are configured to switch control of the vehicle system from automatic control to manual control responsive to the identification of the speed difference, and wherein the one or more processors also are configured to determine route parameters and to switch control of the vehicle system from automatic control to manual control based on the route parameters.

15. The control system of claim 14, wherein the one or more processors also are configured to determine an alertness of the operator of the vehicle system based on at least one of: the operator's response to the alarm or the operator's lack of response to the alarm; and
wherein the one or more processors also are configured to switch control of the vehicle system from automatic control to manual control responsive to determining the alertness of the operator of the vehicle system.

16. The control system of claim 14, wherein the one or more processors also are configured to determine an alertness of the operator of the vehicle system based on at least one of: the operator's response to the alarm or the operator's lack of response to the alarm; and
wherein the one or more processors also are configured to switch control of the vehicle system from automatic control to manual control responsive to a determination of trip parameters.

* * * * *